S. E. CONDON.
PACKING.
APPLICATION FILED SEPT. 5, 1908.

911,808.

Patented Feb. 9, 1909.

UNITED STATES PATENT OFFICE.

SAMUEL E. CONDON, OF NEW YORK, N. Y.

PACKING.

No. 911,808.　　　　Specification of Letters Patent.　　　　Patented Feb. 9, 1909.

Application filed September 5, 1908. Serial No. 451,792.

*To all whom it may concern:*

Be it known that I, SAMUEL E. CONDON, a citizen of the United States, residing in the borough of Brooklyn, city of New York, and State of New York, have invented certain new and useful Improvements in Packing, of which the following is a specification, reference being had therein to the accompanying drawing, in which—

Figure 1:
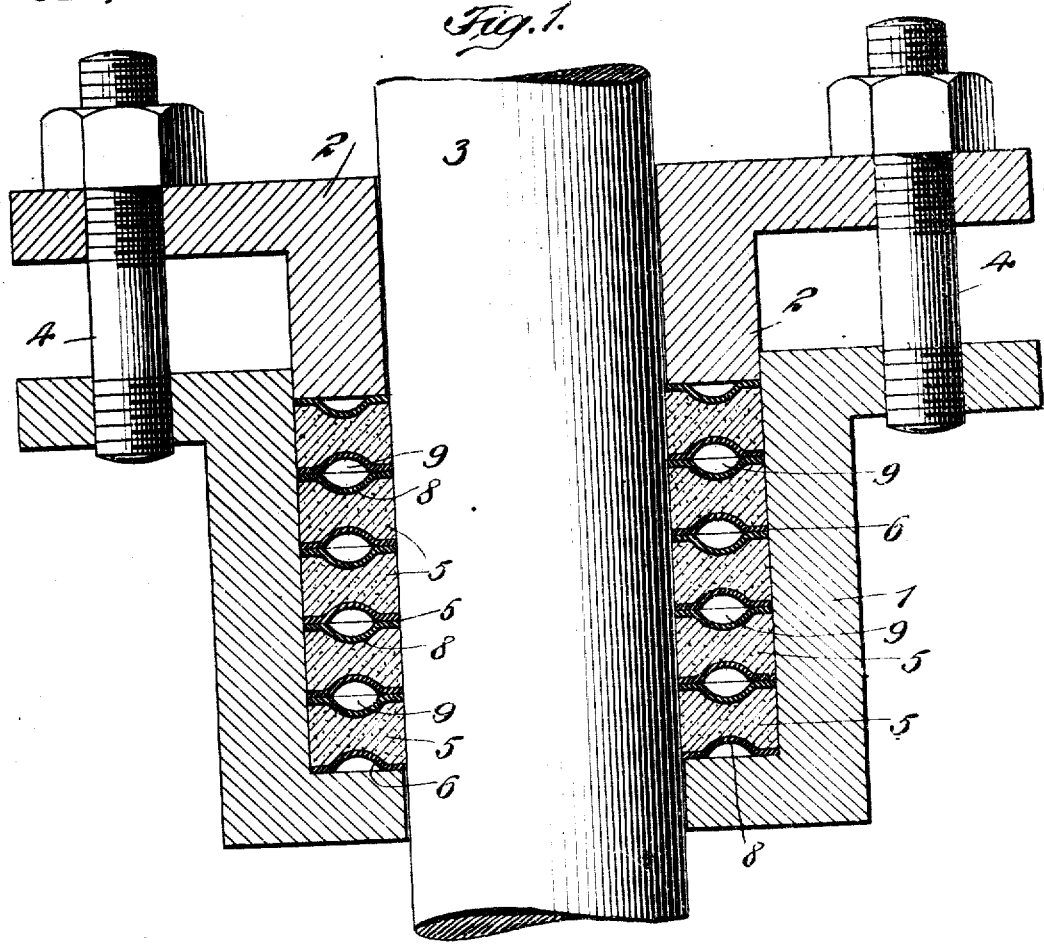
Figure 2:
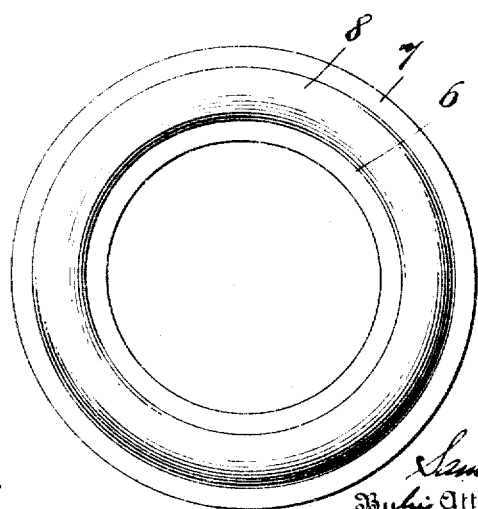

Figure 1 is a vertical sectional view of the stuffing box showing my improved packing therein; and Fig. 2 a face view of one of my metallic packing rings.

One of the objects of this invention is to provide a combination fibrous and metallic packing and to so construct the metallic packing that it will serve as a means to expand the fibrous packing and at the same time be itself expanded by the compressing force exerted by the gland.

In all-metallic packing it is extremely difficult to maintain the joints between the sections of the packing at all times tight; and in all-fibrous packing it is extremely difficult to keep a tight joint between the piston or other reciprocating part and the packing. It is to overcome these difficulties and to provide a combination metallic and fibrous packing which may be compressed through the gland to take up the wear both of the metallic packing and of the fibrous packing that I have designed my peculiar form of packing.

A further object of the invention is to so construct the metallic portions of the packing that there will be considerable surplus metal to be worn away before the packing has reached the limit of its compression.

Referring to the various parts by numerals, 1 designates an ordinary stuffing box; 2 the gland therefor; 3 the piston rod or other moving part adapted to reciprocate through the stuffing box, and 4 the ordinary bolts for setting up the gland on the packing.

The packing consists of alternate layers of fibrous packing 5 and metallic packing 6. The fibrous packing may be of any suitable form and I desire it understood that by the term fibrous packing I mean to include any soft non-metallic packing. The metallic packing consists of rings 7 of soft sheet metal. Each ring is formed with an annular hollow bead 8, about midway between the inner and outer margins of the ring. The reverse side of the bead forms an annular channel in the ring.

In making up a set of packing for a stuffing box one metallic ring is placed in the bottom of the box with its bead uppermost, as shown clearly in Fig. 1. A suitable quantity of fibrous or soft non-metallic packing is placed around the stuffing box on top of the metallic member. A second ring of metal is then placed on the soft packing with its annular channel uppermost. Another metallic packing is now placed on the second member with its annular bead uppermost so that an annular chamber 9 is formed between the two contacting sections of the metallic packing. This arrangement of soft packing and the metallic members is continued until the stuffing box is entirely packed. The uppermost metallic member is placed with its bead down against the packing, its annular channel being uppermost so that the inner end of the gland will contact with the flat surfaces of the ring, as indicated in Fig. 1. It will thus be seen that as the gland is pressed inwardly by means of the bolts the annular ribs of the metallic rings will be gradually compressed, forcing the surplus metal in the rings inwardly against the piston rod and outwardly against the wall of the stuffing box, thereby making a tight joint around the piston rod and also around the wall of the stuffing box. As the reciprocating piston wears away the soft packing and the metallic packing the gland is forced inwardly, thereby compressing the metallic packing and forcing the surplus metal towards the piston rod to take up the wear; and by forcing the metallic sections of the packing towards each other the soft packing is forced outwardly against the wall of the stuffing box and inwardly against the reciprocating part.

It is to be noted that each metallic section is absolutely independent of all the other metallic sections and that each is free to expand sufficiently to make the necessary tight joint without regard to the positions of all the other metallic members. It will thus be seen that the failure of one set of metallic members to properly expand to make a tight joint will not in the least effect the efficiency of the other metallic members. This I consider a great advantage as in many metallic packings each part is dependent upon the proper action of all the other metallic parts and the chances of leakage are thereby multiplied. In my construction each metallic section forms an independent packing capable of making a tight joint against the stuffing box wall and around the piston. This is important for the reason that as the number of metallic sections is increased the number of tight joints is also increased. It will also be noted that the packing may be used, by slightly compressing it, until all of the surplus metal in the beads of the metallic rings has been worn off by the piston or other reciprocating part.

Having thus described my invention what I claim as new and desire to secure by Letters Patent, is:—

1. A packing comprising a series of layers of soft packing and interposed layers of metallic packing, the metallic packing being capable of lateral extension under compression, and the soft packing separating the layers of metallic packing.

2. A packing comprising a series of layers of soft non metallic packing and interposed layers of metallic packing, the metallic packing being formed with an annular hollow portion adapted to be flattened under compression whereby the edges of the packing may be forced against the wall of the stuffing box and the packed member, and the soft packing will form a compressible cushion between the layers of metallic packing.

3. A packing comprising a series of rings of soft non-metallic packing, a series of interposed metallic rings between the rings of soft packing, each of said metallic rings being formed with an annular rib on one face and a corresponding annular channel on its opposite face, the rib being capable of being compressed whereby the inner edge of the ring will be forced inwardly against the packed member, and the soft non-metallic packing separating the metallic rings and being compressible between them.

4. A packing comprising a series of sections of soft non-metallic packing and interposed metallic rings, a pair of rings being interposed between adjoining sections of non-metallic packing, each of said metallic rings being formed with an annular rib on one of its faces and a corresponding annular groove on its opposite face, a pair of these metallic rings being arranged between each adjoining pair of non-metallic packings, the grooves in said rings being opposed whereby an annular hollow chamber is formed around the packing, the non-metallic packing preventing the interposed pairs of metallic packing rings contacting with the adjoining pairs of metallic rings, and said non-metallic rings being compressible between said metallic rings.

5. A packing comprising a series of rings of non-metallic packing, a series of interposed sheet metal rings between the rings of non-metallic packing, each of said metallic rings being distorted in transverse section and being capable of being compressed whereby the inner edge of each ring may be forced inwardly against the packed member, the non-metallic packing separating some of the metallic rings and being compressible between them.

6. A packing comprising a series of rings of non-metallic packing, a pair of sheet metal rings interposed between the rings of the non-metallic packing, the rings of each pair being formed with opposed hollow portions, whereby hollow chambers will be formed between each pair of sheet metal rings, said rings being adapted to be flattened by compression, the non-metallic packing separating the pairs of sheet metal rings and preventing said metallic rings contacting with each other and being compressible between said pairs of metallic rings, whereby the metal rings will serve to expand the non-metallic packing and the metallic packing will be compressed through the non-metallic packing.

In testimony whereof I hereunto affix my signature in the presence of two witnesses this 1st day of September 1908.

SAMUEL E. CONDON.

Witnesses:
E. H. KAUFMANN,
WM. R. DAVIS.